(12) United States Patent
Toftner

(10) Patent No.: US 9,428,237 B2
(45) Date of Patent: Aug. 30, 2016

(54) MOTORCYCLE WITH ADJUSTABLE GEOMETRY

(76) Inventor: Peer Toftner, Yven (NO)

(*) Notice: Subject to any disclaimer, the term of this patent is extended or adjusted under 35 U.S.C. 154(b) by 86 days.

(21) Appl. No.: 13/813,909

(22) PCT Filed: Jul. 29, 2011

(86) PCT No.: PCT/NO2011/000217
§ 371 (c)(1),
(2), (4) Date: Feb. 26, 2013

(87) PCT Pub. No.: WO2012/018262
PCT Pub. Date: Feb. 9, 2012

(65) Prior Publication Data
US 2013/0180792 A1 Jul. 18, 2013

Related U.S. Application Data

(60) Provisional application No. 61/370,113, filed on Aug. 3, 2010.

(51) Int. Cl.
*B62D 61/02* (2006.01)
*B62K 11/02* (2006.01)
(Continued)

(52) U.S. Cl.
CPC .............. *B62K 11/02* (2013.01); *A62B 18/006* (2013.01); *F04D 25/084* (2013.01); *F04D 29/4226* (2013.01)

(58) Field of Classification Search
CPC ......... B62K 11/04; B62K 11/02; B62M 7/00
USPC ........................................................ 180/219
See application file for complete search history.

(56) References Cited

U.S. PATENT DOCUMENTS 1,164,122 A * 12/1915 Berg ............................. 180/219
3,337,240 A * 8/1967 Rizzato ........................ 280/278
(Continued)

FOREIGN PATENT DOCUMENTS

| GB | 2450512 A | 12/2008 | |
|---|---|---|---|
| WO | 2005/100140 A1 | 10/2005 | |
| WO | WO 2008049203 A1 * | 5/2008 | ............. B62K 11/04 |

OTHER PUBLICATIONS

Written Opinion received for PCT Patent Application No. PCT/NO2011/000217 mailed on Oct. 19, 2011, 4 pages.
(Continued)

*Primary Examiner* — Joseph Rocca
*Assistant Examiner* — Conan Duda
(74) *Attorney, Agent, or Firm* — Morrison & Foerster LLP

(57) ABSTRACT

The invention is a motorcycle with a main frame (1), the main frame (1) holding a rear swing arm assembly (2) with a rear wheel assembly (3), said main frame (1) holding an engine (12) and a drive train (13) connected to the rear wheel assembly (3). The main frame (1) is connected via a pivot joint (9) near the main frame's (9) upper, fore portion to a top frame (7), and the pivot joint (9) has a transverse axis (9') relative to the main frame (1). The top frame (7) has a rearwards extending seat frame (8) provided with a seat (15) and a forward extending steering neck frame (5) holding a steering neck (6) further holding a triple tree assembly (14) with a front fork assembly (4) with a front wheel assembly (10). The main frame (1) is provided with an actuator assembly (16) for providing rotation of the top frame (7) relative to the main frame (1). The actuator assembly (16) is connected at a first lower end (161) to a lower connection point (17) near a rear portion of the main frame (1), and connected at an opposite, second upper end (162) to an upper connection point (18) at the top frame (7). Thus the motorcycle may be adjusted for rake, trail and seat elevation between a racing sport configuration and a custom or "chopper" configuration through use of the actuator (16).

5 Claims, 3 Drawing Sheets

(51) Int. Cl.
*A62B 18/00* (2006.01)
*F04D 25/08* (2006.01)
*F04D 29/42* (2006.01)

(56) References Cited

U.S. PATENT DOCUMENTS

| | | | | |
|---|---|---|---|---|
| 4,616,840 | A | * | 10/1986 | Green ............................ 280/247 |
| 4,909,537 | A | * | 3/1990 | Tratner .......................... 280/278 |
| 5,014,808 | A | * | 5/1991 | Savard et al. ................. 180/219 |
| 5,458,213 | A | * | 10/1995 | Nakaya et al. ............... 180/219 |
| 5,967,538 | A | * | 10/1999 | Callaluca ............... B62K 21/00 180/219 |
| 7,234,558 | B2 | * | 6/2007 | Toftner ......................... 180/219 |
| 7,950,736 | B2 | * | 5/2011 | Olson ....................... 297/215.14 |
| 8,181,981 | B2 | * | 5/2012 | Stenberg .................... 280/281.1 |
| 8,226,120 | B2 | * | 7/2012 | Berg ............................. 280/775 |
| 2005/0236203 | A1 | * | 10/2005 | Toftner ......................... 180/219 |
| 2006/0060405 | A1 | * | 3/2006 | Pender ................... B62K 19/32 180/219 |
| 2007/0004488 | A1 | * | 1/2007 | Kirila ..................... G09B 9/058 463/11 |
| 2008/0018076 | A1 | * | 1/2008 | Lagar ..................... B62K 21/06 280/281.1 |
| 2009/0212529 | A1 | * | 8/2009 | Stenberg ................ B62K 11/04 280/287 |

OTHER PUBLICATIONS

International Preliminary Report on Patentability received for PCT Patent Application No. PCT/NO2011/000217, issued on Feb. 5, 2013, 5 pages.

International Search Report received for PCT Patent Application No. PCT/NO2011/000217 mailed on Oct. 19, 2011, 3 Pages.

* cited by examiner

MOTORCYCLE WITH ADJUSTABLE GEOMETRY

CROSS REFERENCE TO RELATED APPLICATIONS

This is a U.S. National Phase patent application of PCT/NO2011/000217, filed Jul. 29, 2011, which claims priority to U.S. Provisional Patent Application No. 61/370,113, filed Aug. 3, 2010, each of which is hereby incorporated by reference in the present disclosure in its entirety.

INTRODUCTION

The present invention relates to a motorcycle. More specifically, the invention relates to mechanisms for adjusting the front fork assembly geometries relative to the main frame, and simultaneously adjusting the seat elevation relative to the main frame.

SUMMARY OF THE INVENTION

The invention is a motorcycle with a main frame, the main frame holding a rear swing arm assembly with a rear wheel assembly, the main frame holding an engine and a drive train connected to the rear wheel assembly, the main frame connected via a pivot joint near the main frame's upper, fore portion to a top frame, the pivot joint having a transverse axis relative to the main frame, the top frame having a rearwards extending seat frame provided with a seat and a forward extending steering neck frame holding a steering neck further holding a triple tree assembly with a front fork assembly with a front wheel assembly, the main frame provided with an actuator assembly for providing rotation of the top frame relative to the main frame about the transverse axis.

In a preferred embodiment, the actuator assembly is connected at a first lower end to a lower connection point near a rear portion of the main frame, and connected at an opposite, second upper end to an upper connection point at the top frame.

FIGURE CAPTIONS

The invention is illustrated in the attached drawings.

FIG. 1 is a side elevation view of a stripped motorcycle with a main frame holding an engine and a drive train assembly connected to a rear swing arm assembly with a rear wheel assembly, the main frame provided with a pivotable top frame holding a combined seat frame and steering neck frame, the steering neck frame holding a triple tree assembly further holding a front fork assembly with a front wheel. An actuator assembly for adjusting the angular position of the top frame relative to the main frame is illustrated.

EMBODIMENTS OF THE INVENTION

Figure 1:
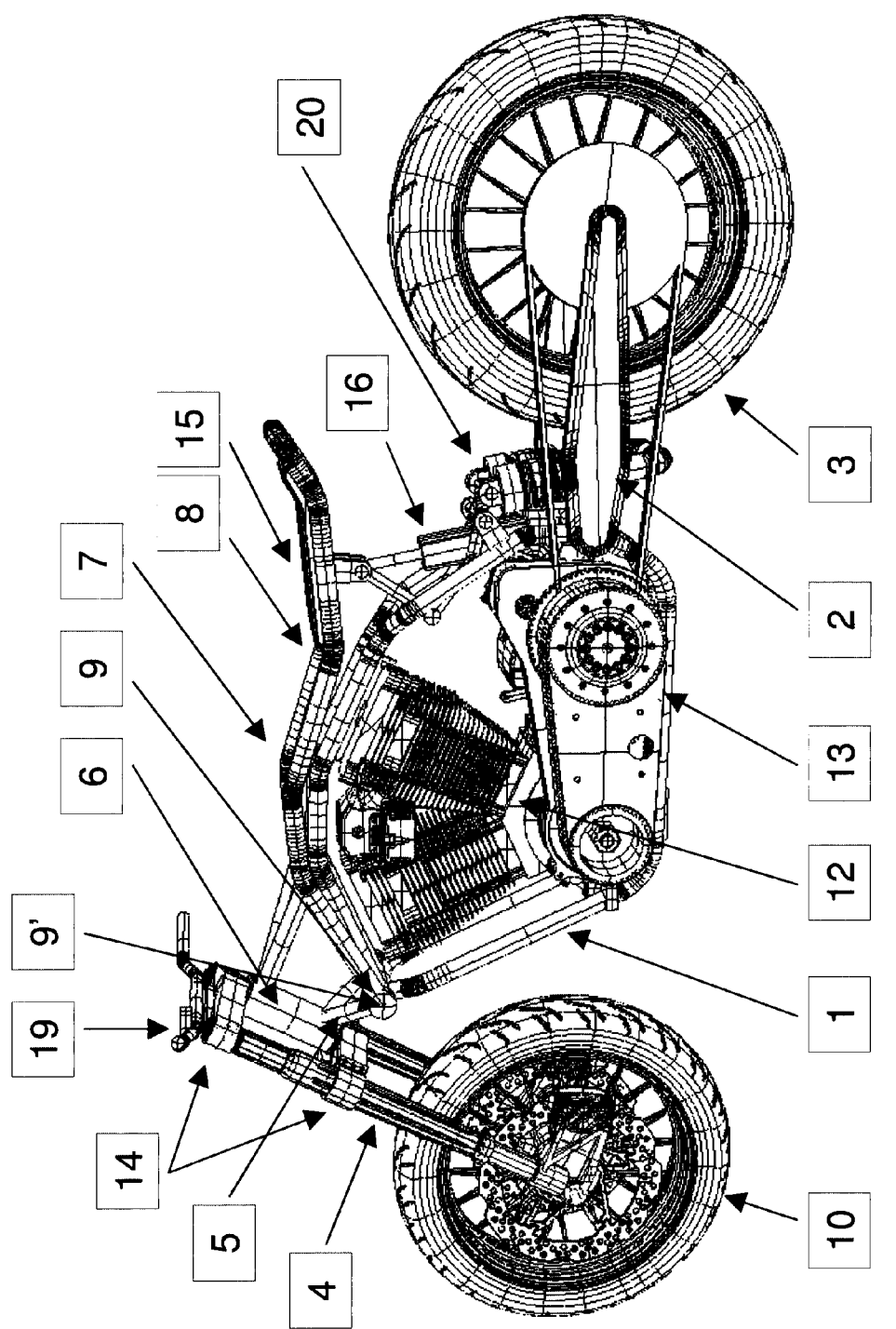

An embodiment of a motorcycle of the invention is illustrated in FIG. 1. The motorcycle of the invention comprises a main frame (1) holding a rear swing arm assembly (2) with a rear wheel assembly (3), the main frame (1) holding an engine (12) and a drive train (13) connected to the rear wheel assembly (3). The engine may be of the internal combustion type, but may alternatively be an electric motor. The engine may alternatively be arranged with the rear swing assembly.

Further, the main frame (1) is connected via a pivot joint (9) near the main frame's (1) upper, fore portion to a top frame (7). The pivot joint (9) has a transverse axis (9') relative to said main frame (1). The top frame (7) has a rearwards extending seat frame (8) provided with a seat (15), and a forward extending steering neck frame (5) holding a steering neck (6) further holding a triple tree assembly (14) with a front fork assembly (4) with a front wheel assembly (10).

Further, the main frame (1) is provided with an actuator assembly (16) for providing rotation of the top frame (7) relative to the main frame (1). The actuator assembly (16) is connected at a first lower end (161) to a lower connection point (17) near a rear portion of the main frame (1), and connected at an opposite, second, upper end (162) to an upper connection point (18) at the top frame (7). In an embodiment of the invention the connection point (18) at the top frame (7) is arranged at said seat frame (8).

Figure 3:
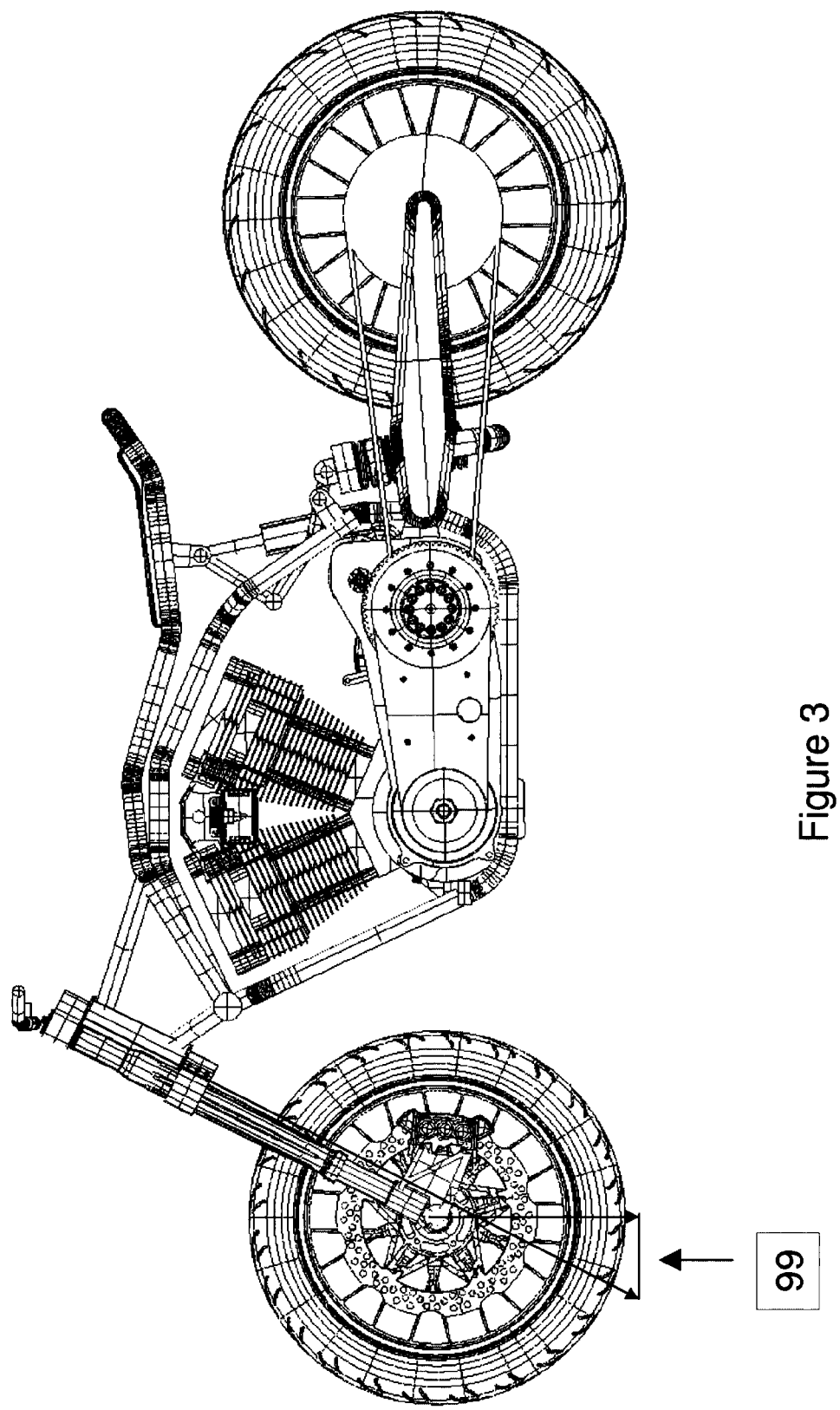
FIG. 3 is an illustration of some important geometric features of the front wheel assembly. The so-called trail (99) is the distance from the front wheel contact point with the ground to the intersection of the axis of the steering neck with the ground.

For the front wheel assembly, the so-called trail (99) is the distance from the front wheel contact point with the ground to the intersection of the axis of the steering neck with the ground, please see FIG. 3. This distance is important to the dynamic properties of the motorcycle and its handling characteristics. The so-called "rake" is the angle with the vertical of the front forks. The trail should be in the range between 50 mm and 150 mm. We may describe three different types of motorcycles having different rake angles and trail distances. First, a sport racing type motorcycle generally has a 24 to 26 degrees rake angle and a corresponding trail distance of 65 to 80 mm. Second, an upright touring motorcycle may have a rake angle of 27 to 29 degrees and a trail distance of 75 to 110 mm. Third, a cruiser or "chopper" type motorcycle may be provided with a front fork assembly with a rake angle of between 30 and all the way up to 50 degrees (or more, in extreme embodiments) and a corresponding trail distance between 100 and 150 mm. A combination of low figures of both rake and trail generally provides agile and aggressive driving and steering dynamics, while the opposite combination of high figures provides calmer and more sedate handling characteristics and steering dynamics.

A so-called sport racing motorcycle generally has a high seat, in the range between 780 mm and 820 mm. In the opposite range of the touring or cruising motorcycle segment, the seat height is in the range from 600 mm to 780 mm.

A general advantage of the invention is that the geometry of the front wheel suspension assembly and the seat frame may simultaneously be adjusted relative to the main frame using the actuator. This provides a motorcycle with the capability of shape-shifting over a range of chassis configurations with rake and trail and seat height properties corresponding to the first, sport racing type motorcycle, the third cruiser or chopper type motorcycle, and intermediates. In an embodiment of the invention the top frame (7) may be rotated so as for the rake to be about 24 degrees, the trail about 80 mm, and the seat height about 800 mm for a so-called sport racing configuration. In the same embodiment, the top frame may be rotated in an opposite direction so as for the rake to be about 31 degrees, the trail to about 120 mm, and the seat height to be about 600 mm, for providing a cruiser configuration.

The actuator may be of any type suitable for rotating the top frame relative to the main frame. In an embodiment of the invention the actuator is of a linear type. The actuator may be of the hydraulic or pneumatic type, and would draw power from a pump connected to the main engine, or of the electromechanichal type drawing power from the engine's generator or electrical accumulator. The person skilled in the art may select a suitable actuator at his or her discression.

In an embodiment of the invention the actuator (16) may be controlled from a rider operated control unit (19) which provides control signals for extending or contracting the length of the actuator (16) according to the driver's desire. The control unit (19) may in an embodiment be a single or double electrical switch for running the actuator (16) in the "longer" or "shorter" direction, in order to adjust the motorcycle between a racing or cruising configuration, and possibly provided with a "stop" or "lock" position inbetween for setting the configuration reached.

Figure 2:
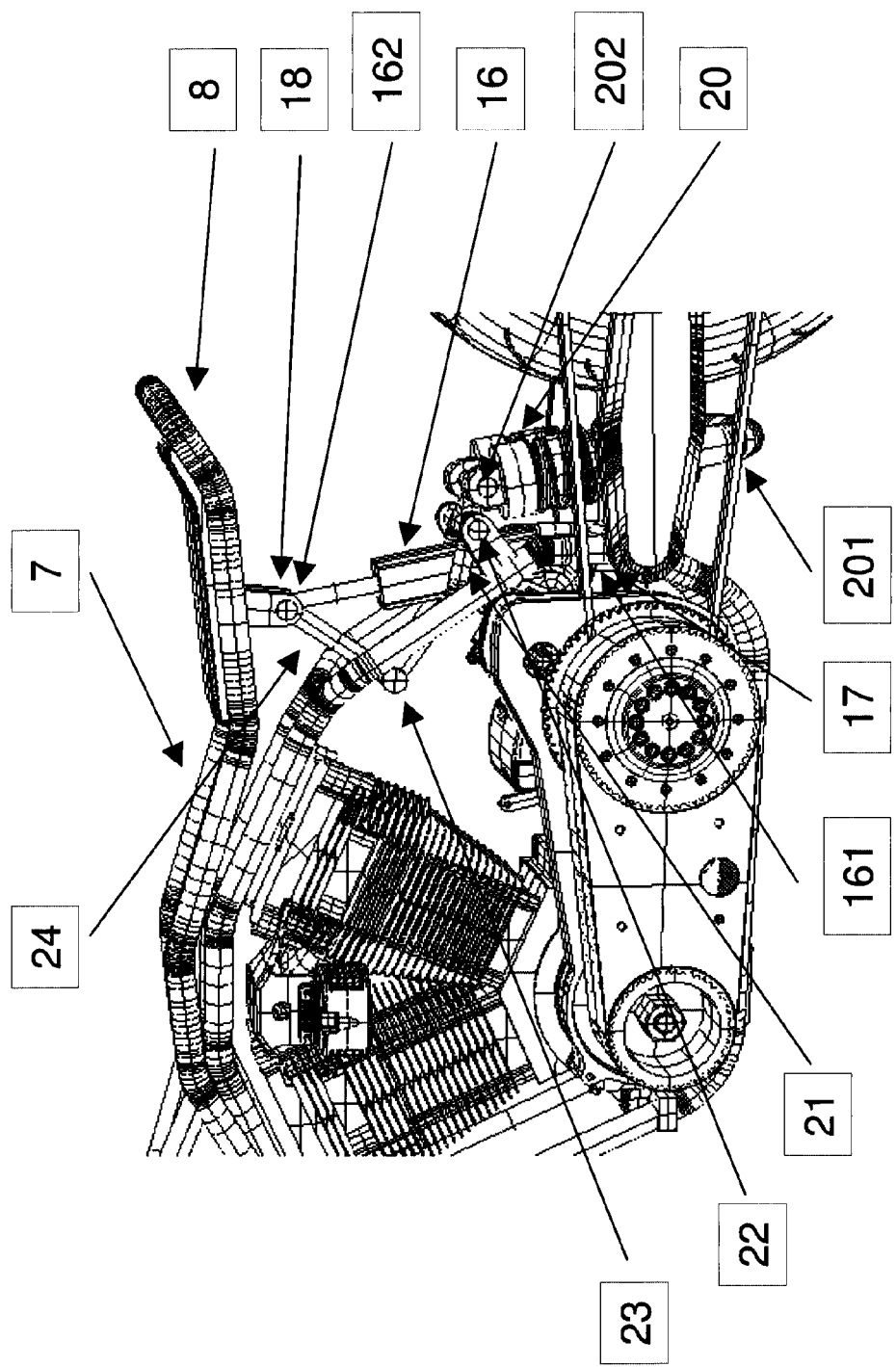
FIG. 2 is an enlarged view of the rear part of the main frame and the seat frame and the rear swing assembly, showing elements of the actuator assembly.

In an embodiment of the invention the rear swing arm assembly (2) is provided with a suspension and shock absorber assembly (20). The suspension and shock absorber assembly is connected at a first, lower end (201) to the rear swing arm assembly (2) and at a second, upper end (202) to the rear portion of the main frame (1). In an embodiment of the invention the second, upper end (202) of the suspension and shock absorber assembly (20) is connected via a suspension pivot arm (21) extending rearwards from a suspension pivot joint (22) at the rear portion of the main frame (1). The suspension pivot arm (21) has a forward extension to a connecting joint (23) to a link arm (24) which links to the top frame (7). In an embodiment the link arm (24) is connected to the top frame (7) in the upper connection point (18) for the upper end of the actuator assembly (16), please see FIG. 2.

An advantage of this arrangement of having the rear swing arm indirectly connected to the top frame is that an adjustment of the front fork rake to a steeper angle and a consequent elevation of the front end of the main frame above the ground will also result in a corresponding elevation of the rear part of the main frame, and will thus maintain the orientation of the main frame relative to the ground while the ride height of the main frame is increased. Conversely, when the front fork rake is adjusted to a less steep angle, the rear part of the main frame will also be lowered, and the ride height will be lowered while the orientation of the main frame will be maintained.

The invention claimed is:

1. A motorcycle configured for shape-shifting and simultaneously adjusting a geometry of a front wheel suspension assembly and a seat height, comprising:
   a rear swing arm assembly;
   a rear wheel assembly;
   an engine;
   a drive train connected to said rear wheel assembly;
   a main frame holding the rear swing arm assembly with the rear wheel assembly and the engine with the drive train;
   a top frame connected pivotally to said main frame at an upper, fore portion of said main frame by a pivot joint having a pivot axis oriented transversely to a longitudinal axis of the motorcycle, said top frame comprising a rearwards extending seat frame provided with a seat and a forward extending steering neck frame, and
   an actuator for providing a rotation of said top frame relative to said main frame about said pivot axis,
   wherein said forward extending steering neck frame holds a steering neck further holding a triple tree assembly with a front fork assembly, so as to rotate said steering neck holding the triple tree assembly with the front fork assembly about said pivot axis by said rotation of said top frame relative to said main frame provided by said actuator, for thereby shape-shifting the motorcycle and simultaneously adjusting a rake angle and a seat height relative to the main frame.

2. The motorcycle of claim 1, wherein an upper end of said actuator is connected to the top frame by an upper connection point arranged at said seat frame and a lower end of said actuator is connected to the main frame by a lower connection point near a rear portion of the main frame.

3. The motorcycle of claim 1, wherein said rear swing arm assembly is provided with a suspension and shock absorber assembly connected at a first, lower end thereof to said rear swing arm assembly and at a second, upper end thereof to a rear portion of said main frame.

4. The motorcycle of claim 3, wherein said second, upper end of said suspension and shock absorber assembly is connected to a rear portion of said main frame via a suspension pivot arm extending rearwards from a suspension pivot joint at the rear portion of said main frame, said suspension pivot arm provided with a forward extension to a connecting joint to a link arm which links to said top frame.

5. The motorcycle of claim 4, wherein an upper end of said actuator is connected to the top frame by an upper connection point arranged at said seat frame and a lower end of said actuator is connected to the main frame by a lower connection point near a rear portion of the main frame, and said link arm is connected to said top frame in the upper connection point for the upper end of said actuator.

* * * * *